Jan. 14, 1947. S. A. MALTHANER 2,414,156
TIRE RIM MOUNTING
Filed Aug. 8, 1944 2 Sheets-Sheet 1

INVENTOR
Sylvester A. Malthaner
BY
ATTORNEYS

Jan. 14, 1947.  S. A. MALTHANER  2,414,156
TIRE RIM MOUNTING
Filed Aug. 8, 1944  2 Sheets-Sheet 2
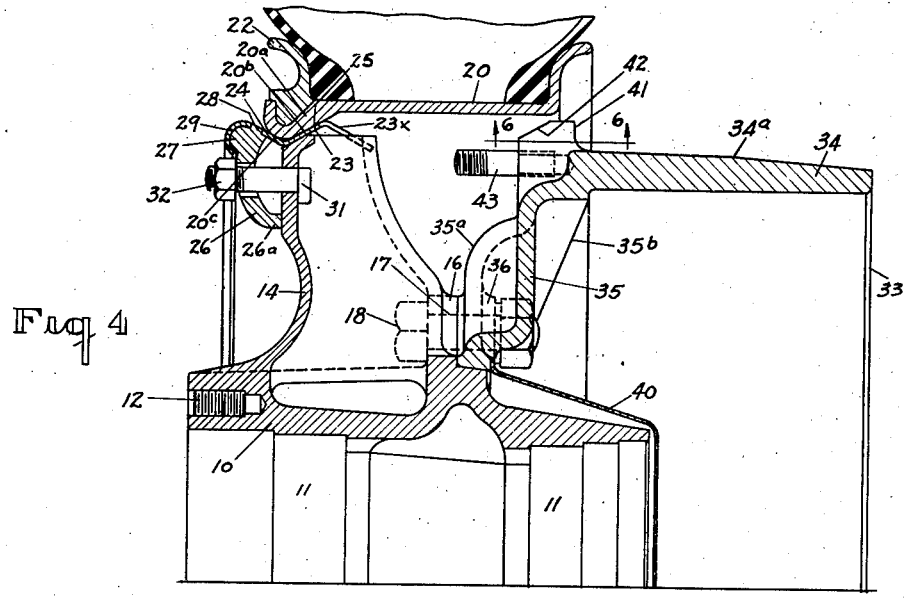
Fig 4
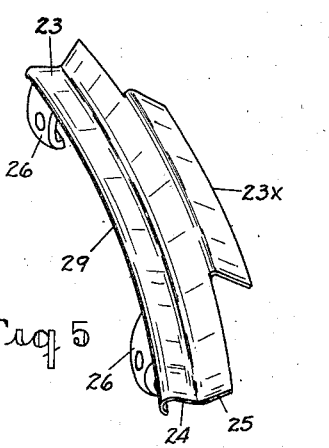
Fig 5
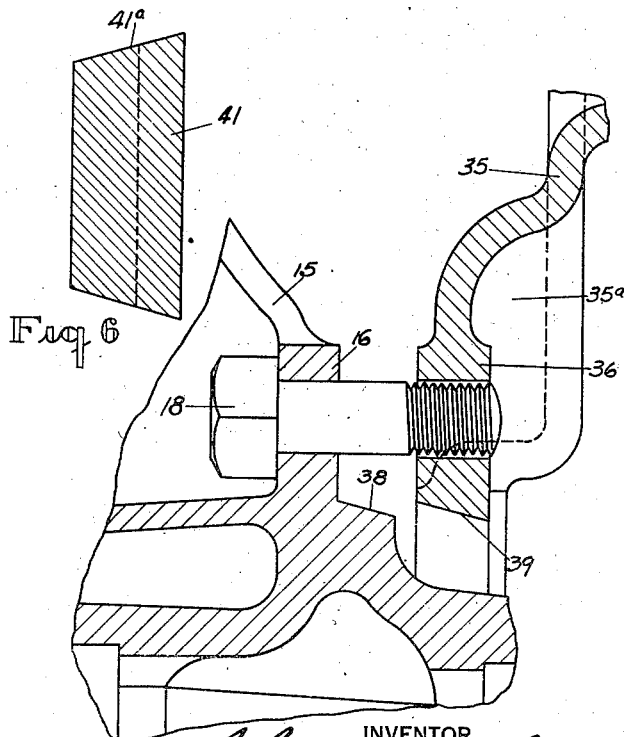
Fig 6
Fig 7
INVENTOR
Sylvester A. Malthaner
BY Hull & West
ATTORNEYS Patented Jan. 14, 1947

2,414,156

UNITED STATES PATENT OFFICE 2,414,156

TIRE RIM MOUNTING

Sylvester A. Malthaner, Erie, Pa.

Application August 8, 1944, Serial No. 548,521

11 Claims. (Cl. 301—13)

This invention relates to dual wheels and has for one of its objects to provide improved means for mounting either a single demountable tire-carrying base or rim or a pair of such bases or rims upon said wheels.

While dual wheels have been provided heretofore with means whereby they may be utilized for the support of a single demountable rim and tire, as well as for the support of two such demountable rims and tires, such utilization has required the employment of special mounting parts, additional to those employed where both rims and tires are secured to these wheels. Due to the construction and arrangement of the mounting parts shown herein, I am able to employ the same mounting means with any standard type of dual wheels, irrespective of whether two rims and tires are applied thereto or a single rim and tire is applied thereto.

A further object of my invention is to provide a cooperating construction of brake drum and mounting means whereby the inner rims and tires of dual wheels may be conveniently and effectively applied to and removed therefrom and whereby the brake drum is capable of carrying the load imposed thereupon by mounting an inner rim and tire thereon.

A further object of my invention is to provide a dual wheel of a standard type with mounting means so arranged that, when the said wheels are revolving, air will be caused to circulate across the brake drum and radially inwardly between the tires and about the hub, thereby to maintain the tires, rims, the brake-drums and linings and the hub bearings against overheating.

A still further object of the invention is to provide individual mounting means for each of the two rims mounted upon dual wheels which will permit each rim to be aligned independently of the other and thereby avoid the necessity for perfect machining of the parts in order that the rims may be properly aligned.

A further object of the invention is to provide means whereby, when it is desired to employ a single rim and tire, they may be secured upon the wheel in such manner as to surround the hub, thereby prolonging the life of the hub bearings as efficiently as if both rims and tires were employed.

Figure 2:
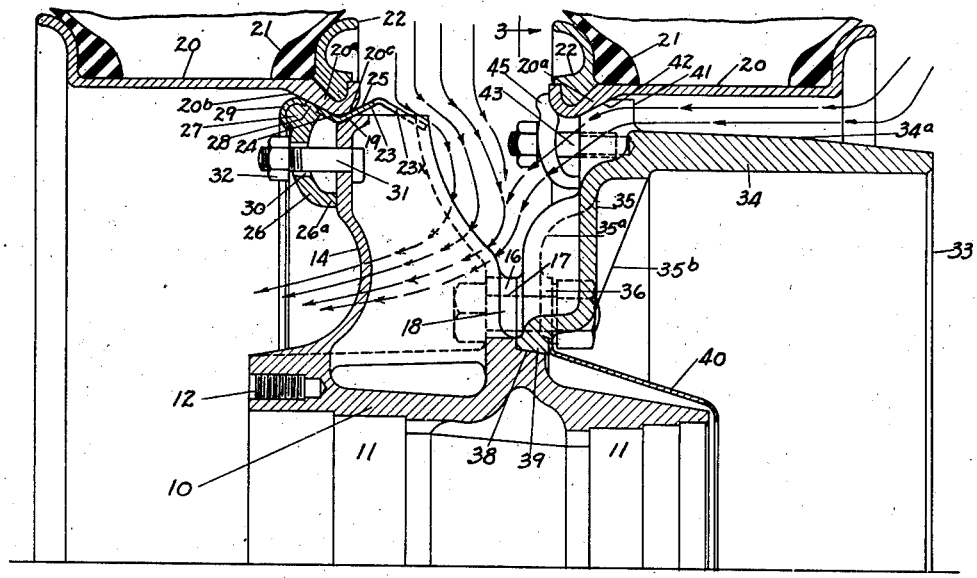
Figures 1, 3:
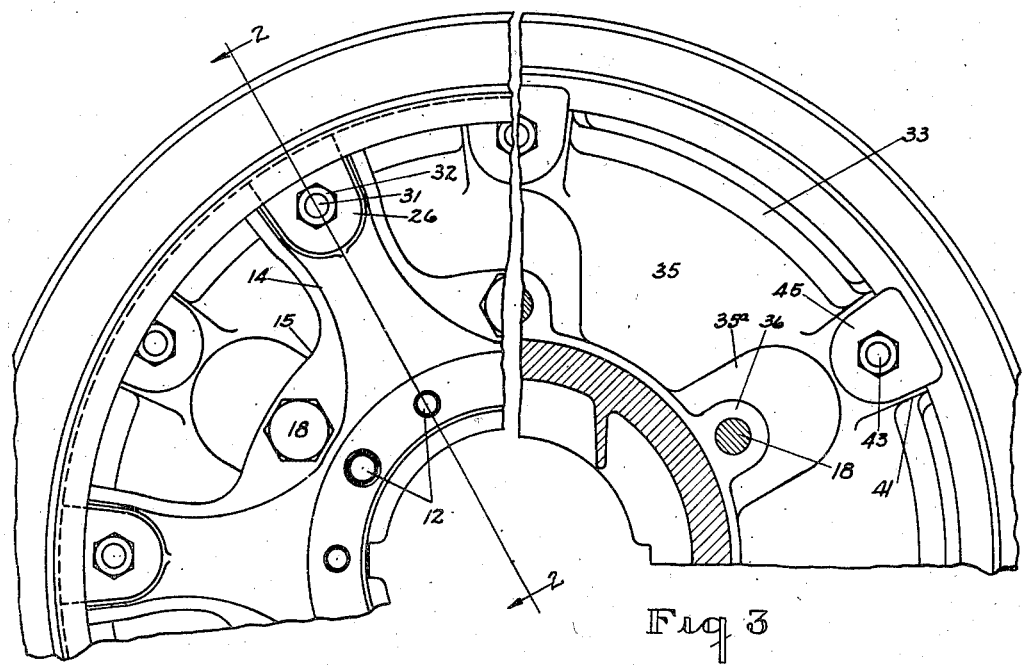

Further and more limited objects and advantages of my invention will be pointed out hereinafter in connection with the drawings hereof, wherein Fig. 1 is a view in elevation of a portion of a dual wheel having my invention applied thereto; Fig. 2 a detail in section taken on the line 2—2 of Fig. 1; Fig. 3 a detail in section taken on the line 3—3 of Fig. 2; Fig. 4 is a view, similar to Fig. 2, showing the manner in which a single rim and tire are mounted upon the wheel shown in Fig. 2; Fig. 5 is a detail in perspective elevation of a portion of the special clamping ring forming part of the assembly for detachably mounting a tire-carrying rim upon the outer ends of the spokes of the wheel; Fig. 6 is an enlarged detail in section taken on the line 6—6 of Fig. 4; and Fig. 7 an enlarged detail in section illustrating the manner in which the brake drum is secured upon the hub, the cooperating parts being separated.

10 denotes a conventional type of wheel center, shown as a hub provided with the usual bearing raceways 11 and as provided with screws 12 whereby the wheel of which the hub forms a part may be used on a live axle by bolting the same to a flange (not shown) connected to or rigid with the axle.

The hub is provided with integral spokes 14 which are connected by ribs 15 having bosses 16 thereon provided with holes 17 for the reception of bolts 18, the purpose of which will be explained hereinafter. The outer end of each spoke is provided with a radially outwardly inclined seat 19, the said seats cooperating with one another to produce an annular support for a demountable rim. With the exception of the particular construction of the ribs 15, the spokes and the seats 19 formed thereon are of standard construction.

The mounting means which I employ with the said seats is novel in construction and possesses the advantages which have been set forth hereinbefore, as well as other advantages which will be pointed out hereinafter. This particular mounting means is adapted to cooperate with the gutter 20$^a$ of a standard demountable rim 20 on which a tire 21 is mounted and on which it is retained by means of the conventional split ring 22.

23 denotes a transversely split clamping ring having a gutter extending therearound, the said gutter being defined between a radially inwardly inclined portion 24 and a radially outwardly inclined portion 25, the inclination of the former portion being the same as the inclination of the seats 19 on the outer ends of the spoke ends and the gutter being adapted to receive therewithin and to engage with its oppositely inclined portions 24 and 25 the oppositely inclined portions 20$^b$ and 20$^c$ of the exterior surface of the bottom of the gutter 20$^a$ of a demountable rim 20, it being noted that the inclination of the surface 20ᵇ of the rim gutter is substantially the same as the inclination of the portion 25 of the clamping ring gutter.

26 denotes clamping members each having an inner end 26ᵃ adapted to abut against the portion of a spoke located radially within the seat 19 thereon and having its outer end provided with an outwardly projecting rounded rib 27, the extreme outer end of each member being provided with a projection 28 adapted to extend through the inclined portion 24 of the clamping ring 23, the extreme outer end of which clamping ring is bent around the rib 27, as shown at 29. Each of the clamping members 26 is provided with an aperture 30 of greater diameter than the diameter of a bolt 31 which is shown as extending therethrough and which is mounted in each of the spokes 14. The outer ends of the bolts are provided with nuts 32.

With the cooperating parts of the rim gutter, the seats 19, the clamping ring 23 and the clamping members 26 arranged as described, it will be evident that, by placing the gutter of the demountable rim within the gutter provided therefor in the clamping ring and by setting up the bolts 31, the clamps will operate to press the rim gutter inwardly causing its surface 20ᶜ to exert a thrust against the adjacent surface 25 of the clamping ring gutter and thereby force the interior surface thereof against the seats 19. This results in effecting a particularly securely wedged seating for the rim 20. By securing the clamping members to the clamping ring, the clamping members are prevented from being disengaged from the ring while providing the said members with sufficient flexibility to compensate for any irregularities in the rim and in the mounting bolts. The clamping ring 23 and clamping members 26 and bolts 31 form a clamping assembly which can be used equally well for securing a rim and tire 21 in the position shown in Fig. 2, or in the position shown in Fig. 4, as will be explained hereinafter.

Cooperating with the seats provided on the spoke ends for the support of a tire-carrying rim, are seats provided on a brake drum assembly, which will now be described. 34ᵃ denotes the outer surface of a brake drum wall 34, the drum being indicated generally at 33, the outer surface conforming in configuration with established engineering practice. For purposes of identification, that end of the brake drum wall 34 which is nearer the outer end of the axle will be referred to hereinafter as "the outer end" of the said wall while the opposite end will be referred to hereinafter as "the inner end" of said wall. The wall 34 increases in thickness from the inner end to the outer end thereof, the section of the wall adjacent the rim supporting portion being the thickest and the wall decreasing in section thence inwardly, thereby obtaining the greatest strength where the brake drum is subjected to the greatest stress. The outer end of the wall 34 has formed therewith an annular mounting wall 35 which is provided with corrugations, indicated at 35ᵃ, and with ribs 35ᵇ, to increase the stiffness thereof. The inner end portion of the mounting wall is provided with bosses 36 which align with the bosses 16 projecting from the ribs 15, said bosses being located between the inner ends of the spokes. Bolts 19, mounted in bosses 16 and 36, serve to seat the wall 35 of the brake drum upon the hub. The annular seating portion of the hub for the wall 35 is radially outwardly inclined, as indicated at 38, and the interior of the annular wall 35 is defined by a rib of greater thickness than the body of said wall and the inner surface of said rib is inclined complementarily to said seating portion 38, as shown at 39, whereby the wall 35 forms a tapered pilot for seating the drum in metal-to-metal contact with the hub, whereby any shocks or stresses to which the brake drum is subjected are transmitted from the cylindrical outer portion thereof to the hub. Furthermore, this construction allows for liberal tolerances between the surfaces 38 and 39.

40 denotes a grease catcher for controlling the overflow of lubricant from the hub bearings in the conventional manner.

41 denotes mounting blocks which extend radially outwardly from the outer end of the wall 34 and which project outwardly beyond the surface 34ᵃ and are provided each with a radially outwardly inclined seating surface 42, similar in contour to the seating surfaces 19 and providing an annular support for a rim. Each block carries a stud 43 having a thread on its outer end for the reception of a nut. The base 20 of a standard demountable rim, having a gutter 20ᵃ and carrying a tire 21 and provided with a conventional split ring 22, is detachably mounted upon the seating surfaces 42 by means of clamping members 45, the inner ends of which are adapted to bear against the cooperating portion of the brake drum wall 35 and the outer ends of which are adapted to engage the outer surface of the gutter 20ᵃ. By slipping these clamping members upon the studs 43 and thereafter applying the nuts to the studs and setting up the nuts, an inner demountable rim with its tire can be firmly secured upon the brake drum which, as pointed out hereinbefore, has been specially designed to enable it to sustain all of the stresses imparted thereto and to transmit the same to the hub.

It will be seen that I have provided not only individual, but novel, mounting means for each of the two rims which are mounted upon my dual wheel and that this mounting means permits each rim to be aligned independently of the other, thereby avoiding the necessity for perfectly machining the parts in order that the rims may be properly aligned. Furthermore, due to the fact that the inner and outer rims are independently mounted upon their respective supports, it is possible to remove an outer rim (with its tire) without resorting to the use of a jack, by merely driving the inner tire upon an incline or other surface elevated above that which is being traversed by the outer tire, which will elevate the outer tire above the road bed or other surface which it has been traversing.

By reference to Figs. 1, 4 and 5, it will be seen that the mounting ring 23 is provided with radially inwardly extending projections 23ˣ between the clamping members 26. It will also be seen by reference to Fig. 6, that the ends of the blocks 41 are inclined and converge toward the space between the spokes and the brake drum, as shown at 41ᵃ. Due to this construction and to the fact that I am enabled to mount both tire-carrying rims upon my wheel without the interposition of a spacer band or aligning ring between the said rims, it will be apparent that the rotation of a dual wheel having rims and tires mounted thereon as described will cause a radially inward circulation of air to be set up between the rims and tires as well as a circulation across the entire outer surface of the brake drum, as indicated by arrows, this air being discharged between the spokes adjacent to the hub. This circulation effectively dissipates brake-drum heat and prevents over-heating of the hub bearings and tires, thereby prolonging the lives of these parts. This preservation against overheating is particularly necessary when tires are made of synthetic rubber, which have thus far proven incapable of withstanding heat to the same extent as tires made of natural rubber.

As is well known, there are numerous occasions wherein it is desirable to operate a vehicle, equipped with a dual wheel, with a single rim and tire. Instances of such occasions are what are known as "driveways," the hauling of light, bulky loads, "dead-heading," and where one tire has become flat and there is no spare tire available. By the construction of the seats 19 on the spokes and the employment therewith of the special mounting means disclosed herein, I am enabled to mount a single rim and tire upon the spoke ends, but with the rim extending inwardly from the seats, thereby surrounding the hub intermediate the ends of the latter. This is accomplished by merely reversing the position of the outer rim and tire shown in Fig. 2, whereby the inclined surface 20$^b$ of the rim gutter 20$^a$ engages the inclined portion 25 of the gutter of the clamping ring and the inclined surface 20$^c$ of the rim gutter engages the inclined portion 24 of the gutter of said ring. By setting up the nuts 32, the rim and tire will be firmly secured in the position shown in Fig. 4. In this case, there can be no radially inward circulation of air between the spokes and the brake drum, due to the obstruction offered by the rim 20. However, the inner end of the rim is spaced from the brake drum, and the ends of the blocks 41 serve, by rotation of the wheel, to cause a flow of air across the braking surface of the brake drum and thence radially inwardly toward the hub and outwardly between the spokes. This circulation is greater than that which is afforded by the conventional manner of mounting rims and tires upon dual wheels and is sufficient to effect the necessary dissipation of heat in the brake drum and to prevent overheating of the tire and the hub bearings.

Having thus described my invention, what I claim is:

1. In a dual wheel, the combination of a hub having spokes secured to and projecting therefrom, means cooperating with the said spokes for securing a demountable rim on the outer ends thereof, a brake drum comprising a substantially cylindrical wall and a corrugated annular mounting wall secured to and projecting from the outer end of the former wall, the former wall being thicker at the outer portion thereof than at the inner end portion thereof and the mounting wall being provided with bosses and having its inner edge portion beveled and the hub being provided with an annular seat beveled complementarily to the beveled edge of the said mounting wall and constituting a pilot for said wall, radially inwardly concave ribs connecting adjacent sides of adjacent spokes, each of said ribs being provided with a boss, and bolts extending through the last mentioned bosses and the bosses on the mounting wall, the first-mentioned wall being provided with an annular support extending radially outwardly from the outer end thereof, and means for clamping a demountable rim upon the annular support.

2. In a dual wheel, the combination of a wheel center and spokes connected thereto and projecting therefrom, each of the said spokes having an inclined seat at the outer end thereof, and mounting means for securing a demountable rim upon said seats, the said mounting means comprising a split clamping ring having a gutter provided between radially inwardly and radially outwardly inclined portions thereof, the radially inner surface of the outwardly inclined portion being inclined complementarily to the inclination of the said seats and adapted to engage the said seats and the inclined portions thereof being adapted to engage the radially inwardly and radially outwardly inclined surfaces, respectively, of the exterior of the gutter of a demountable rim, clamping members each having an inner end adapted to bear against the body of a spoke with its outer end engaging the inner surface of the radially inwardly inclined portion of the clamping ring adjacent thereto, means connected with each spoke for forcing the outer end of the clamping member associated therewith toward the inclined seat on the outer end of said spoke, a brake drum secured to said wheel center, and means for detachably mounting a demountable rim upon the said brake drum externally of the external surface thereof.

3. In the dual wheel recited in claim 2, the outer ends of the clamping members being connected with the clamping ring.

4. In the dual wheel recited in claim 2, the clamping ring being provided with radially inwardly directed deflecting portions intermediate of the spokes thereby to deflect air entering between the said rims toward the wheel center.

5. In a dual wheel, the combination of a wheel center and spokes connected thereto and projecting therefrom, each of the said spokes having an inclined seat at the outer end thereof, and mounting means for securing a demountable rim upon said seats, the said mounting means comprising a split clamping ring having a gutter provided between radially inwardly and radially outwardly inclined portions thereof, the radially inner surface of the outwardly inclined portion being inclined complementarily to the inclination of the said seats and adapted to engage the said seats and the outer oppositely inclined portions thereof being adapted to engage the radially inwardly and radially outwardly inclined surfaces, respectively, of the exterior of the gutter of a demountable rim, clamping members each having an inner end adapted to bear against the body of a spoke with its outer end engaging the inner surface of the radially inwardly inclined portion of the clamping ring adjacent thereto, means connected with each spoke for forcing the outer end of the clamping member associated therewith toward the inclined seat on the outer end of said spoke thereby to thrust the radially outwardly inclined outer surface of the clamping ring along the inclined seats on the spoke ends and to cause the radially inwardly inclined inner surface of said clamping ring to force the rim gutter toward said seats thereby to secure the gutter firmly upon the said seats, a brake drum and mounting means for securing a demountable rim upon the brake drum.

6. In a wheel, the combination of a wheel center and spokes connected thereto and projecting therefrom, each of the said spokes having an inclined seat at the outer end thereof, and means for detachably securing the gutter of a demountable rim to the said seats, said means comprising a split clamping ring having a gutter provided between radially inwardly and radially outwardly inclined portions thereof, the radially inner surface of the outwardly inclined portion being inclined complementarily to the inclination of the said seats and adapted to engage said seats, and the oppositely inclined outer portions adapted to receive the gutter of a demountable rim therebetween, and clamping means connectable with said spokes and adapted to engage the outer portion of said clamping ring thereby to force the said ring toward the said seats.

7. In a wheel, the combination of a wheel center and spokes connected thereto and projecting therefrom, each of the said spokes having an inclined seat at the outer end thereof, and means for detachably securing the gutter of a demountable rim to the said seats, said means comprising a split clamping ring having a gutter provided between radially inwardly and radially outwardly inclined portions thereof, the radially inner surface of the outwardly inclined portion being inclined complementarily to the inclination of the said seats and adapted to engage said seats and the oppositely inclined outer portions adapted to receive the gutter of a demountable rim therebetween, clamping members each having an inner end adapted to bear against the body of the spoke and an outer end secured to the cooperating outer portion of the clamping ring, bolts having their inner ends anchored within the said spokes and extending through apertures provided therefor in the said clamping members, and nuts on said bolts.

8. In the wheel recited in claim 6, each clamping member having at its extreme outer end a projection adapted to enter an aperture provided therefor in an outer portion of the clamping ring and each clamping member also having adjacent to its outer end an outwardly extending rounded projection, the outer end of the clamping ring being bent around and secured to the said projections.

9. In a dual wheel, the combination of a wheel center and spokes secured to and projecting therefrom and each having an inclined seat at its outer end, means for securing the gutter of a demountable rim upon the said seats, the said means comprising a split clamping ring having a gutter provided between radially inwardly and radially outwardly inclined portions thereof, the inner surface of the radially outwardly inclined portion being adapted to engage the inclined seats upon the spoke ends, and the outer surfaces of both portions of said ring being adapted to engage radially oppositely extending portions of the gutter of a demountable rim, means for forcing the clamping ring toward the said seats, the clamping ring being provided with radially inwardly extending deflecting portions between the spokes, a brake drum also connected to the said wheel center and having at the outer end of its external wall radially outwardly extending blocks having seats for the gutter of a demountable rim, and means for detachably securing the gutter of said rim upon the said seats, the ends of the said blocks being beveled whereby they converge toward the space between the spokes and the brake drum.

10. In a wheel, the combination of a wheel center and spokes connected thereto and projecting therefrom, each of the said spokes having an inclined seat at the outer end thereof, and mounting means for securing a demountable rim upon said seats, the said mounting means comprising a split clamping ring having a gutter provided between radially inwardly and radially outwardly inclined portions thereof, the radially inner surface of the outwardly inclined portion being inclined complementarily to the inclination of the said seats and adapted to engage the said seats and the outer oppositely inclined portions thereof being adapted to engage the radially inwardly and radially outwardly inclined surfaces, respectively, of the exterior of the gutter of a demountable rim, clamping members each having an inner end adapted to bear against the body of a spoke with its outer end engaging the inner surface of the radially inwardly inclined portion of the clamping plate adjacent thereto, and means connected with each spoke for forcing the outer end of the clamping member associated therewith toward the inclined seat on the outer end of said spoke thereby to thrust the radially outwardly inclined inner surface of the clamping ring along the inclined seats on the spoke ends and to cause the radially inwardly inclined inner surface of said clamping ring to force the rim gutter toward said seats thereby to secure the gutter firmly upon the said seats.

11. In a dual wheel, the combination of a wheel hub, spokes secured to said hub and each provided at its outer end with a seat for a demountable rim, a brake drum carried by said wheel hub and comprising an external wall and circumferentially spaced rim-supporting members extending radially outwardly from the outer end of said wall, the opposite ends of each rim-supporting member being beveled, whereby they converge toward the space between the spokes and the brake drum, means for securing a demountable rim upon the spoke ends, and means for securing a demountable rim upon the circumferentially spaced rim-supporting members on said brake drum wall.

SYLVESTER A. MALTHANER.